(12) United States Patent
Faye (10) Patent No.: US 11,272,437 B2
(45) Date of Patent: Mar. 8, 2022

(54) METHOD FOR ESTIMATING THE AVAILABILITY AND RELATIVE PROXIMITY OF WIRELESS NETWORK NODES

(71) Applicant: Luxembourg Institute of Science and Technology (LIST), Esch-sur-Alzette (LU)

(72) Inventor: Sébastien Faye, Distroff (FR)

(73) Assignee: Luxembourg Institute of Science and Technology (LIST), Esch/Alzette (LU)

( * ) Notice: Subject to any disclaimer, the term of this patent is extended or adjusted under 35 U.S.C. 154(b) by 0 days.

(21) Appl. No.: 16/958,343

(22) PCT Filed: Dec. 21, 2018

(86) PCT No.: PCT/EP2018/086683
§ 371 (c)(1),
(2) Date: Jun. 26, 2020

(87) PCT Pub. No.: WO2019/129727
PCT Pub. Date: Jul. 4, 2019

(65) Prior Publication Data
US 2021/0068041 A1 Mar. 4, 2021

(30) Foreign Application Priority Data
Dec. 29, 2017 (LU) .................................. LU100599

(51) Int. Cl.
*H04W 88/08* (2009.01)
*H04W 48/16* (2009.01)
*H04W 64/00* (2009.01)

(52) U.S. Cl.
CPC ......... *H04W 48/16* (2013.01); *H04W 64/006* (2013.01); *H04W 88/08* (2013.01)

(58) Field of Classification Search
CPC ........................... H04W 88/08; H04W 64/006
See application file for complete search history.

(56) References Cited

U.S. PATENT DOCUMENTS

| 2008/0004037 A1* | 1/2008 | Achlioptas | G01S 5/0236 455/456.1 |
| 2014/0038599 A1* | 2/2014 | Bienas | H04W 60/04 455/434 |
| 2016/0212642 A1* | 7/2016 | Ljung | H04W 76/28 |

(Continued)

OTHER PUBLICATIONS

International Search Report, PCT/EP2018/086683 dated Mar. 27, 2019, 3 pages.

(Continued)

*Primary Examiner* — Qutbuddin Ghulamali
(74) *Attorney, Agent, or Firm* — Rankin, Hill & Clark LLP (57) ABSTRACT

The present invention provides a method for mapping the wireless network environment as observed from a computing device having at least one network interface for accessing said environment. The mapping method requires limited storage space and processing power, so that it may be executed on said computing devices without requiring further network services. Structured mapped data generated from gathered network discovery traces enables a plurality of location-based, mobility or network routing services.

14 Claims, 2 Drawing Sheets

(56) References Cited

U.S. PATENT DOCUMENTS

2017/0206334 A1  7/2017  Huang

OTHER PUBLICATIONS

Gareth Ayers, et al. "Crowd-Sourcing Wi-Fi Coverage Data to Build Self-Mapping Radio Maps", Sep. 17, 2012, 9 pages.
International Search Report, PCT/EP2018/086585, dated Mar. 13, 2019, 2 pages.
Kjaergaard et al., "Mobile Sensing of Pedestrian Flocks in Indoor Environments Using WiFi Signals", 2012 IEEE International Conference on Pervasive Computing and Communications, Lugano, Mar. 19, 2012, 8 pages.
Derango, et al., "GeO-LANMAR: A Scalable Routing Protocol for Very Large, Dense Ad Hoc Networks with Group Motion", Global Telecommunications Conference, Globecom '05, vol. 5, Nov. 28, 2005, 6 pages.
U.S. Office Action from corresponding application U.S. Appl. No. 16/958,310, dated Jun. 4, 2021, 12 pages.

* cited by examiner

METHOD FOR ESTIMATING THE AVAILABILITY AND RELATIVE PROXIMITY OF WIRELESS NETWORK NODES

TECHNICAL FIELD

The present invention lies in the field of communication systems, and in particular relates to the mapping of a wireless environment, as detected at a computing device having at least one network interface.

BACKGROUND OF THE INVENTION

In order to leverage the possibilities brought about by the pervasive use of mobile computing devices having access to wireless networks, it is interesting to have the ability to attribute a mobile computing device, possibly associated with a user, to a specific location and/or a specific time. This allows for example for the provision of location-based services or mobility related applications, such as location recognition or personal tracking.

Nowadays, device tracking using the Global Positioning System, GPS, or similar satellite based systems are the gold standard for known shared mobility solutions, and for device, i.e. GPS receiver, positioning in general. Although the GPS system offers accurate positioning data, it also requires considerable storage space and has a high energy consumption profile. Energy consumption is a limiting factor in today's mobile computing devices such as tablet computers, smartphones, but even more so in devices attributed to the Internet of Things, IoT. Furthermore, the high level of accuracy provided by the GPS system may give rise to privacy issues regarding the movement and activity of users, while such a privacy intrusion may not be necessary for the provision of location based services, for example. As the GPS system operates only with the line of sight of several satellites among the GPS satellite constellation, it inherently cannot cover all places. In particular, indoor positioning is precluded. Further, known methods for localizing a device generally imply that the device is connected to a public network, such as the Internet, from which map data is available as a service. By using such a service, the location of the device is often tracked by the service provider.

Technical Problem to be Solved

It is an objective of the present invention to provide a method and system which overcome at least some of the disadvantages of the prior art.

SUMMARY OF THE INVENTION

In accordance with an aspect of the invention, a method for subjectively mapping the wireless network environment of a computing device is provided. The device comprises at least one wireless network interface for communicating with wireless network access nodes, a processing unit and a memory element. The method comprises the following steps:
i) at said device, during consecutive time slots forming a timespan, discovering wireless network access nodes;
ii) in each time slot, generating a discovery record for each discovered access node, said discovery record comprising a unique identifier of said access node, together with an index of the current discovery time slot, and storing said discovery record in said memory element;
iii) after said timespan, using a mapping unit, processing said discovery records into mapped data, comprising:
for each access node, associating an indication of the access node's availability with the access node's unique identifier, wherein the indication comprises a discovery count, which is the number of discoveries of the access node within said timespan;
generating a graph data structure, wherein discovered access nodes are represented by a respective vertex, and wherein two vertices are connected by an edge conditionally on the discovery of the corresponding access nodes in a same time slot;
iv) storing the resulting mapped data in a memory element.

Preferably, all discovered access nodes are represented by a respective vertex in said graph data structure.

The mapping unit may comprise a data processor or electronic circuitry configured or programmed to provide the at least the functionalities required by step iii Preferably, the computing device may aggregate discovery records from at least one further computing device performing steps i) and ii) of the method. The aggregated discovery records may preferably be provided to the mapping unit for the processing of step iii) and iv).

Preferably, during the step of generating a graph structure, two vertices are connected by an edge if the corresponding access nodes have been discovered in a same time slot at least a predetermined number of times. The predetermined number may preferably by 1.

Preferably, during the step of generating a graph data structure, a child vertex may be connected to a parent vertex only if the access node corresponding to the child vertex has always been discovered in the same time slots as the access node to which the parent vertex corresponds. Preferably, a child vertex has a lower or equal discovery count than its parent vertex. Even more preferably, a child vertex has a lower discovery count than its parent vertex.

In accordance with an aspect of the invention, a method for estimating the availability and relative proximity of wireless network access nodes, using a computing device, without using geolocation data of said access nodes is provided. The computing device comprises at least one wireless network interface for communicating with wireless network access nodes, a processing unit and a memory element. The method comprises the following steps:
a) at said device, during consecutive time slots forming a timespan, discovering wireless network access nodes;
b) in each time slot, generating a discovery record for each discovered access node using the processing unit, said discovery record comprising a unique identifier of said access node, together with timing information identifying the current discovery time slot, and storing said discovery record in said memory element;
c) after said timespan, processing said discovery records using data processing means, comprising:
for each discovered access node, generating metadata comprising an indication of the access node's availability, wherein the indication comprises a discovery count, which is the number of discoveries of the access node within said timespan, and associating said metadata with the access node's unique identifier in a memory element;
d) using the data processing means, generating data indicating that any two discovered access nodes were in proximity of each other if they have been discovered in the same time slot, and storing said data in a memory element.

The memory element may preferably be a memory element of the computing device, or a memory element to which said processing means have read/write access, either locally or through a data communication channel Preferably, said device may be a mobile device and the discovery of wireless network access nodes may preferably be made while the position of the mobile device is evolving.

Said device may further preferably comprise sensing means for estimating a displacement speed of the device, and wherein the duration of said timeslots may preferably depends on the displacement speed of the device.

Preferably, the duration of said timeslots may depend on the context of the device. The context of the device may comprise an indication of movement of the device. Preferably, the device may comprise context sensing means, comprising for example an altimeter, a gyroscope or an accelerometer, which are operatively connected to the data processing unit. A shorter timeslot duration may be used when the sensed context indicates that the device is moving, while a longer timeslot duration may be used when the sensed context indicates that the device is substantially at rest. Alternatively, the context may be pre-recorded using scheduling data in a memory element to which the processing unit has access. Alternatively, the processing unit may detect a change of context based on the newly discovered access nodes in the set of discovery records, wherein a constant change of at least a part of the set of discovered access nodes within a given timespan may indicate that the device is moving, whereas as constant set of discovered access nodes in within a given timespan may indicate that the device is at rest.

Preferably, during step c), the data processing means may generate a graph data structure, wherein discovered access nodes are represented by a respective vertex, and wherein two vertices are connected by an edge conditionally on the discovery of the corresponding access nodes in a same time slot, and wherein at step d), any two discovered access nodes are identified as having been in proximity of each other if the corresponding vertices in said graph structure are connected by an edge.

The data processing means may preferably generate data indicating that any two discovered access nodes were in proximity of each other if they have been discovered in a same time slot at least a predetermined number of times.

Preferably, the data processing means may generate data indicating that any two discovered access nodes belong to the same physical environment if the access nodes have always been discovered in the same time slots.

The data processing means may preferably comprise a data processing unit of a computing device.

The computing device may preferably comprise a plurality of wireless network interfaces of different types, for communicating with wireless network access nodes of different types. The type of each discovered access node may preferably be stored in said discovery record at step b). Preferably, the type of each discovered access node may be associated with each access node in said mapped data.

The wireless network access node type may preferably comprise a cellular data network access node, a wide area network, WAN, access node, or a personal area network, PAN, access node.

Preferably, the mapping unit or the data processing means may be said computing device's processing unit.

The mapping unit or the data processing means may further preferably be a processing unit of a network node, which receives said discovery records from the computing device via a data transmission.

The unique identifier may comprise a MAC address of an access node, or Cell ID. The unique identifier may preferably be globally unique. Preferably, the unique identifier may be unique to a predetermined context or set of network nodes. Preferably, the unique identifier may change in time. The unique identifier may for example be periodically and randomly generated by said access node.

The unique identifier stored in said discovery record may preferably comprise an irreversible hashed value of information identifying said discovered network access node.

The indication of the access node's availability may preferably comprise an indication of the received signal strength at the computing device and/or an indication of the access node's type.

Preferably, the method may further comprise the step of associating at least a subset of access nodes in said mapped data structure with a geographical location. The geographical location may preferably be obtained by user input to the computing device. Alternatively, the geographical location may be retrieved from a database comprising geographical data, to which the computing device has at least intermittent read access.

Preferably, the method may further comprise the step of associating at least a subset of access nodes identified as having been in proximity of each other with a geographical location.

The method may further comprise the subsequent steps of:
  discovering, at the computing device, at least one access node, generating unique identifiers for said access nodes and associating an indication of each access node's availability with said unique identifiers;
  if at least corresponding subset of the unique identifiers and associated indications is found in said mapped data or in a memory element, concluding that the computing device is located within the wireless networking environment described by said mapped data or in said memory element.

In accordance with another aspect of the invention, a device is provided. The device comprises a networking interface, a processing unit and a memory element, wherein the processing unit is configured for generating mapped data from a set of provided discovery records spanning a timespan divided into time slots, wherein a discovery record comprises a unique identifier of and access node, together with an index of a discovery time slot. The processing unit is further configured as follows:
  for each access node, the processing unit is configured to associate an indication of the access node's availability with the access node's unique identifier, wherein the indication comprises a discovery count, which is the number of discoveries of the access node within said timespan;
  the processing unit is configured to generate a graph data structure, wherein all discovered access nodes are represented by a respective vertex, and wherein two vertices are connected by an edge conditionally on the discovery of the corresponding access nodes in a same time slot;
  the processing unit is configured to store the resulting mapped data in a memory element.

In accordance with an aspect of the invention, device comprising a networking interface, a processing unit and a memory element is provided, wherein the processing unit is configured for generating metadata from a set of provided discovery records spanning a timespan divided into time slots, wherein a discovery record comprises a unique identifier of and access node, together with an index of a discovery time slot, and further wherein:

for each access node, the processing unit is configured to associate an indication of the access node's availability, wherein the indication comprises a discovery count, which is the number of discoveries of the access node within said timespan, and associating the resulting metadata with the access node's unique identifier in a memory element;

the processing unit is configured to generate data indicating that any two discovered access nodes were in proximity of each other if they have been discovered in the same time slot, and storing said data in a memory element.

According to another aspect of the invention, a computer program comprising computer readable code means is provided, which when run on a computer, causes the computer to carry out the method in accordance with aspects of the invention. Preferably, the code means may, when run on a computer, cause the computer to carry out the method according to any aspects of the invention.

In accordance with a final aspect of the invention, a computer program product comprising a computer-readable medium is provided, on which the computer program according to aspects of the invention is stored.

Aspects of the present invention provide the possibility to generate a subjective map of a computing device's wireless network environment. The method does not generate a geographic map based on absolute geolocation data or coordinates and does not use absolute geolocation data comprising geographic coordinates. Rather, the generated subjective map provides structured data indicating a device-centric view of a network environment, providing an estimate of the relative proximity between discovered network access nodes, and rich metadata of the nodes, including an indication of their availability. This previously unavailable information enables a host of application to be implemented based on the discovered network environment. For device-centric location-based services, it is often unnecessary to know the exact global coordinates of a device. The invention provides structured information on a device's environment, which is for many applications sufficient for the provision of location-based services or for example services relating to shared mobility, without infringing on the device's user's privacy. The method only requires traces of network discoveries as an input, which allows for lightweight implementations as it only requires a limited amount of memory storage and processing power. As the method in accordance with the invention may be advantageously executed locally on the computing device of which the environment is being mapped, it provides enhanced reliability, responsiveness, security and privacy as compared to known methods requiring Internet access and/or satellite positioning signals. Other applications that are enabled by embodiments of the invention include but are not limited to selective packet routing algorithms in the mapped network environment.

In comparison with known methods that are based on GPS coordinates for localizing network access nodes on a geographic map, the proposed method provides the further possibilities of discovering local features of a network, and for example mobility patters of access nodes.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes features of the invention in further detail based on preferred embodiments and on the figures, without limiting the invention to the described embodiments. Unless otherwise stated, features described in the context of a specific embodiment may be combined with additional features of other described embodiments. Throughout the description, similar reference numerals will be used for similar or the same concepts across different embodiments of the invention. For example, reference numerals 110 and 210 all refer to a computing device having a wireless network interface, in accordance with the invention.

The wording "computing device" or equivalently "device" is used throughout the description to describe any computing device that is equipped with a wireless networking interface, and that can advantageously be attributed to a user. Examples of a computing device include but are not limited to a Personal Computer, PC, a laptop computer, a smartphone, a tablet computer, a smart television, a smart home appliance, e.g. a fridge equipped with a networking interface, smart glasses, a smart watch, wearable connected devices, connected vehicles, smart Internet of Things, IoT, objects and the like.

In the context of the invention, the wording "mapping unit" is equivalently used with "data processing means". The mapping unit or data processing means are for example implemented by a data processor of a computing device, which is programmed through appropriate circuitry or computer software to realize the functions described for the mapping unit or data processing means.

Figure 1:
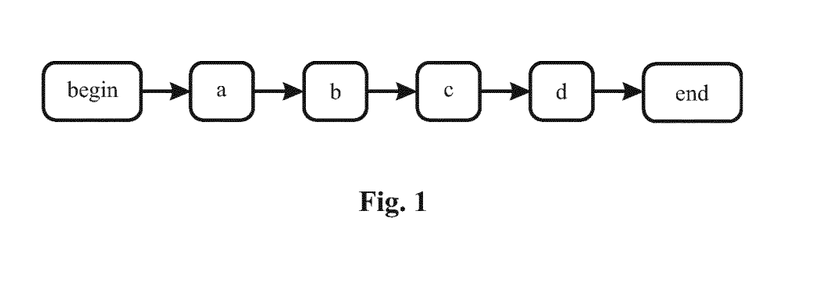
FIG. 1 is a flow diagram showing the main steps according to a preferred embodiment of the method according with the invention.

FIG. 1 shows the main method steps in accordance with a preferred embodiment of the invention. At a first step a) a computing device having a wireless network interface for communicating with wireless network access nodes, discovers at least one wireless network access node. Depending on the wireless network interface, the detected access node may comprise any of the following:

- a Wireless Personal area network, WPAN (e.g. Bluetooth™ standard IEEE 802.15.1, ZigBee™ IEEE 802.15.4)
- a Wireless Local area network, WLAN (e.g. Wi-Fi™ IEEE 802.11)

a Wireless Metropolitan area network, WMAN (e.g. WiMax™ IEEE 802.16)

a Wireless Wide area network, WWAN (e.g. cellular networks: LTE™, UMTS™, . . . )

The device is equipped with a data processor configured to generate a discovery record for each discovered access node within a given timeslot. This operation is repeated for each of a plurality of timeslots forming at least one timespan and the data processor has access to a clock unit providing the current time. The operation may be repeated over a plurality of timespans, which may or may not be adjacent in time. A discovery record comprises an identifier capable of uniquely identifying the discovered access nodes, either globally or within the considered network, and an indication of the time slot of discovery. The timing information may for example comprise an absolute timestamp, a relative timestamp with respect to the starting time of measurements at the device, an index identifying a measurement period/time slot in a set of periodic measurements, or any other timing information that allows the absolute time of discovery to be recovered. Moreover, several discoveries of the same access node (or of the same set of access nodes) may be summarized in a combined discovery record comprising as timing information an explicitly stated period, e.g. from 0:00 to 1:35. All discovery records are stored in a memory element, such as a Hard Disk Drive, HDD, Solid State Drive, SDD, a volatile memory element such as a Random-Access Memory, RAM, module, or any virtual memory unit such as distributed storage, where the physical storage spans multiple interconnected devices. This corresponds to step b).

At step c) a data processor implementing a mapping unit, or equivalently, data processing means, is configured to extract useful mapped data from the raw discovery records that have been previously stored in the memory element. The mapped data may be considered to be metadata describing properties of the discovered network access nodes, or properties of the physical structure/proximity among discovered access nodes. The data processing comprises the following steps:

for each access node, an indication of the access node's availability is associated with the access node's unique identifier. The indication may for example be a discovery count, which is the number of discoveries of the access node within said timespan during which the discovery records were recorded. Alternatively, or in addition to this, the indication of the access node's availability may comprise an indication of the signal strength received at the computing device from each discovered access nodes, preferably averaged over multiple discoveries thereof. Such further information may preferably provide more precise availability information. The generated data is stored in a memory element as metadata further describing the properties of the discovered network access nodes.

Using the data processing means, data is generated that indicates that any two discovered access nodes were in proximity of each other if they have been discovered in the same time slot, and said data is stored in a memory element.

The metadata generated by the processing means based on the discovery records may further comprise an indication of the network context or network structure in which a particular network node has been discovered This may for example include the number of proximal neighbouring nodes within a given radius. The metadata may further comprise a flag associated with a network access node, if the latter is discovered at an unusual time of night, for example in the middle of the night. The metadata that is generated for an access node may further include an indication of features that characterized the device that discovered the access node, including the context of the measurement (i.e. the measurement device was at rest or on the move, including an estimation of the displacement speed). Further, the data processing means may use an overall weighting metric to summarize at least part of the features recorded in the metadata into a value. The resulting value may then be used to objectively compare the features of a discovered access node to those of other access nodes. The resulting value may itself be recorded in the metadata.

The provision of the metadata significantly enriches the data describing the discovered network environment, and it allows for multiple applications based on the discovered infrastructure. These include but are not limited to recognizing context of the measuring device, place and trip recognition, data packet routing in the detected networking infrastructure, personal mobility assistant, social networking, access point selection, geocasting.

These actions correspond to steps c) and d) respectively.

Preferably, step d) may include the generation of a graph data structure, wherein all discovered access nodes are represented by a respective vertex, and wherein two vertices are connected by an edge conditionally on the discovery of the corresponding access nodes in a same time slot. The graph structure, together with the above outlined indications for each access nodes may for example be stored in a structured table or in a database. A connected sub-graph of the graph structure indicates a set of access nodes that were in proximity of each other.

The unique identifier of a wireless access point may include a basic service set ID, BSSID, a media access control, MAC, address, an internet protocol, IP, address, another unique identifier, or any combination thereof. For cellular access nodes, a cell identifier may further be provided. Such information is generally gathered by the computing device from the beacon signals that it uses to discover the access nodes. The unique identifier of an access node may dynamically change in time, for example from a first unique identifier to a second identifier. In such a case, the comparing unit is preferably configured to match the second identifier to the first identifier, i.e., to detect that both unique identifiers refer to the same access node. If the access node having the second identifier is discovered in proximity with a similar or with the same set of access nodes than the access node having the first identifier, but at different discovery times, the comparing node concludes that the first and second unique identifiers designate the same physical access node.

Figure 2:
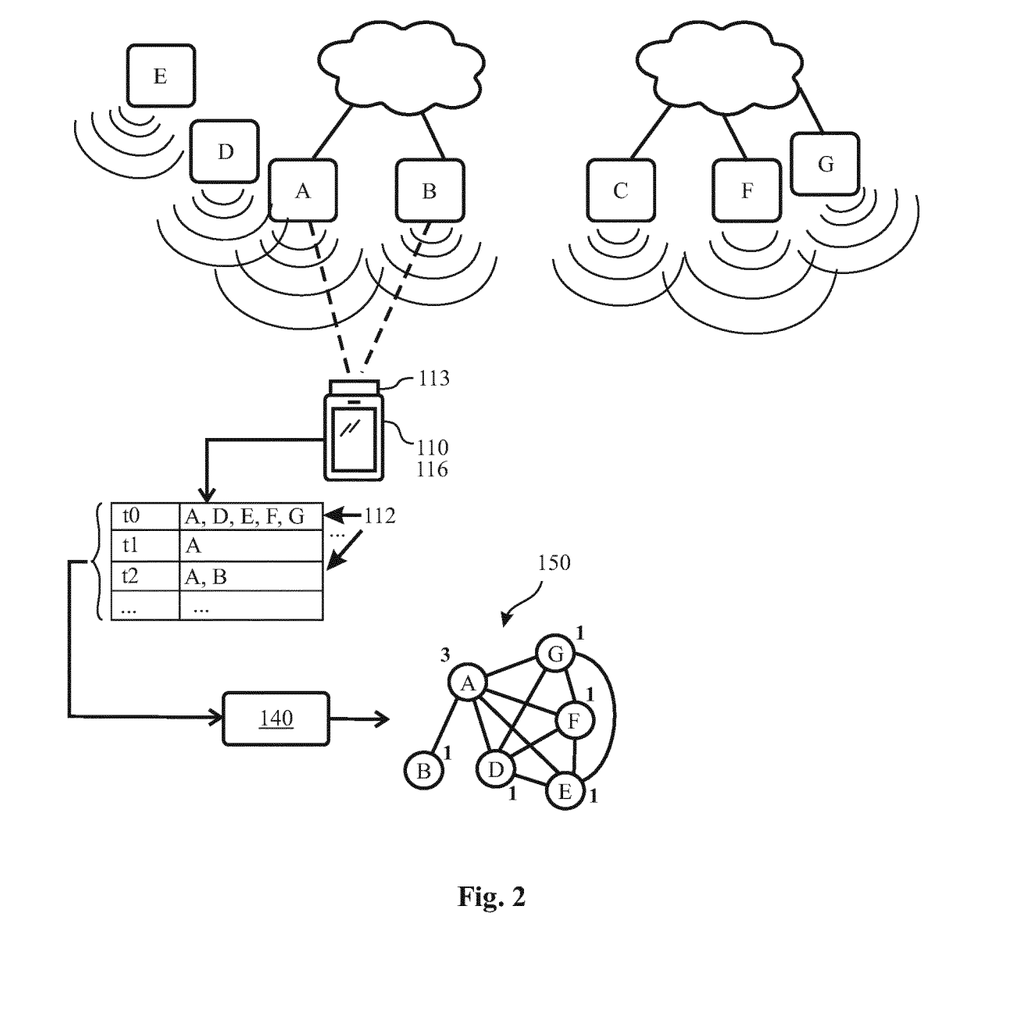
FIG. 2 gives a schematic illustration of a preferred embodiment of a system for implementing a preferred embodiment of the method in accordance with the invention.

FIG. 2 illustrates the interaction between the different components or network entities while the method outlined in FIG. 1 is performed, in accordance with a preferred embodiment. Computing device 110 is a tablet computer having a WiFi™ networking interface 113, a processing unit such as a Central Processing Unit, CPU, 116 and a non-illustrated memory element. Preferably, the CPU comprises a clock unit. The networking interface 113 allows the devices to discover any WiFi™ network access nodes A-G during a timespan that is divided into consecutive time slots. A WiFi™ network access node typically broadcasts a beacon signal that includes a unique identifier. The device 110 receives the beacon if it is within the node's range of communication. This approach is called passive network scanning. Alternatively, and if other networking technologies are used, the device 110 may perform active scanning wherein the device actively transmits a probing signal, to which any compatible network access node within the device's communication range responds by transmitting its unique identifier back to the device. This corresponds to step a) in FIG. 1.

In accordance with the example of FIG. 2, at timeslot $t_0$, device 110 discovers the access nodes A, D, E, F and G. It then generates corresponding discovery records 112 as a trace of these network discoveries. The discovery records are stored in a memory element to which the device's processing unit 116 has write access. At timeslot $t_1$, the device 110 has been moved to another location, where it discovers the access node A, while at timeslot $t_2$, access nodes A and B are discovered. The discovery records are stored in a memory element to which the device's processing unit 116 has write access. This corresponds to step b) in FIG. 1.

As the wireless computing device 110 moves from one location to another, its set of discovery records grows more heterogeneous. The discovery records are transmitted to a mapping unit, or equivalently, to data processing means 140 via a data communication channel. The mapping unit is either implemented by a processing unit at a dedicated node in a communication network to which the computing device 110 has access, or by a collection of interconnected network nodes which collaboratively provide the functionality of the mapping unit in a distributed way. In an alternative embodiment, several computing devices, possibly associated with a common user, are configured to aggregate the discovery records collected within a common timespan at an aggregating device.

The aggregating device is one of the devices, which is either designated by the user, or which is elected automatically among the user's devices using a distributed voting algorithm. The aggregating device then provides all aggregated discovery records to the mapping unit, so that all the user's devices contribute to the discovery records that are processed by the mapping unit. At the mapping unit, the network discovery information collected by the computing device 110 and stored in the discovery records 112 is processed into mapped data providing a structured view of the wireless network environment in which the computing device 110 has evolved during the timespan when the discovery records 112 were generated. In the embodiment shown in FIG. 2, for each access node, a discovery count is associated with the access node's unique identifier. The discovery count is the number of discoveries of an access node within the timespan during which the processed discovery records were generated. Further, in accordance with this embodiment, a graph data structure is generated, wherein all discovered access nodes are represented by a respective vertex, and wherein two vertices are connected by an edge if the corresponding access nodes have been discovered at least once in a same timeslot.

The discovery count provides an indication of the availability of each node during said timespan, wherein the structure of the graph provides information on the physical environment and relationships among the discovered access points, as observed from the computing device 110. A primary vertex that is connected to multiple other secondary vertices represents an access node that has been discovered recurrently while the computing device was in different locations. The primary vertex likely represents a wireless access node having a wide communication range and it may be attributed to a large geographical area. Alternatively, the primary vertex may represent an access node that has followed the user over a prolonged time period, such as a smartwatch, for example. The secondary vertices connected to the same primary vertex likely represent wireless access nodes having a narrower communication range, as they have only been discovered intermittently in some locations the computing device has visited. They may be attributed to a smaller geographical area, which is at least partially included in the larger area that is attributed to the primary vertex.

It should be noted that a different computing device evolving differently within in the same environment and within the same timespan will likely generate different discovery records, so that the corresponding generated mapped data will likely also be different. However, as users tend to have repetitive behaviour, i.e. getting up at home, commuting to work, working in the same office, eating at a cafeteria, etc. . . . , it is not necessary that all users/devices are equipped with an absolute representation of their environment, which would represent a ground truth. The subjectively mapped data provided by aspects of the invention provides sufficient information so that the computing device may recognize a previously mapped environment (home, work, restaurant, . . . ) when wireless access nodes corresponding to the mapped data structure is discovered anew. By providing a detailed subjective view of the computing device's network environment, which is not objectively exhaustive, the proposed method allows to protect the computing device's user's privacy. At the same time, the memory usage and processing power required to generate the mapped data, which takes only network discovery traces as an input, is relatively low.

Figure 3:
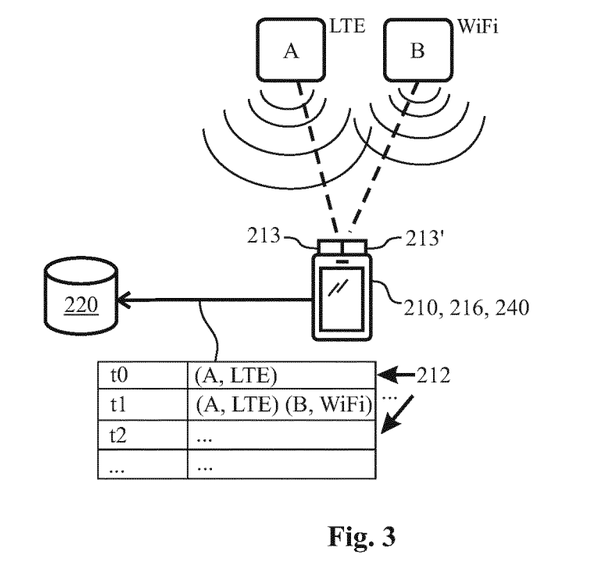
FIG. 3 gives a schematic illustration of a preferred embodiment of a system for implementing a preferred embodiment of the method in accordance with the invention.

FIG. 3 shows another embodiment of the invention. The computing device 210 comprises a plurality of networking interfaces 213, 213' of different types, each interface providing access to another networking technology/protocol and is capable to discover network access nodes A, B of different networking technologies. For example, access node A is an antenna of an LTE™ cellular data network, while access node B is a WiFi™ access node. In this example, the device 210 comprises networking interfaces of the two aforementioned types. The device 210 further comprises a processing unit 216 having write access to a memory element, which is for example structured as a table or database. The processing unit 216 is configured to store its set of discovery records 212 in the memory element 220. Network discovery is performed as described in the context of previous embodiments. In this example, in addition to a unique identifier of each discovered access node and an indication of the time slot during which the discovery was made, the generated discovery records 212 include an indication of the type of the discovered access node. In this example the indication allows to identify each discovered access node as being either an LTE™ or WiFi™ access node. Of course, the information stored in each discovery records may be structured differently, without departing from the scope of the present invention. The mapping unit 240 of this example is implemented by the processing unit 216 of the computing device 210. The mapping unit processes the discovery records generated within a given timespan as described here above.

By using the additional information indicating the type of each discovered network node, and by associating the respective access network type to each vertex in the generated graph structure, the mapping unit is able to validate or provide structure among discovered network access nodes. Based on the type of access node or any other further information stored in a discovery record, the method in accordance with this embodiment is for example able to discern whether a primary vertex of the graph structure, which has been persistently discovered by the device represents an access node covering a large geographic area (type: LTE™), or whether the corresponding access node followed the user during the period of discovery (type: Bluetooth™). The mapping unit 240 has access to a memory element in which the types of access networks and their associated features and/or communication ranges are provided. By using this data, the mapping unit is able to refine the network environment map: a unique identifier/vertex that represents a discovered LTE™ access node having a high associated discovery count provides the information that the computing device that generated the corresponding discovery records was in a given area of a city when the corresponding network discoveries were made. A unique identifier/vertex that represents a discovered WiFi™ access node provides the information that the computing device that generated the corresponding discovery records was likely in a building when the corresponding network discoveries were made. In addition, a unique identifier of a Bluetooth™ access node, indicates a room in which the computing device was located at the time of discovery. By combining the graph structure, discovery count and network access type/technology together, the resulting mapped data becomes increasingly useful for a host of applications.

In an additional embodiment, the method includes a step of matching discovered access nodes to geographical locations. The geographical locations may be absolute, e.g. GPS coordinates that are provided by the access nodes themselves or that are automatically inferred from a geographical database, or the geographical locations may be subjective, e.g. "Home", "Work", "Campus", and may be provided as a user input into the mapped data. This geographical metadata allows the computing device to recognize the environment as being one of the specified geographical locations, based on discovered wireless access nodes that have been previously mapped. Once the environment is recognized by the computing device, this information may be used to enable location-based services. For example, once the computing device detects it is at the "Home" location, it is configured to transmit lighting instructions to Bluetooth devices within the detected environment, which implement smart home lighting functions. If the "Work" location is detected, the ringing volume of a smartphone is automatically reduced. As the mapped data includes all access nodes within an environment, including an indication of their availability, the computing device may further select a data transmission route depending on the discovered environment. If a large data file is to be transmitted from the computing device, the computing device is for example configured to select the network access node within its mapped environment, which has the highest availability to do so. The provided examples of applications that make use of the mapped data as provided by aspects of the invention are not exhaustive.

Figure 4:
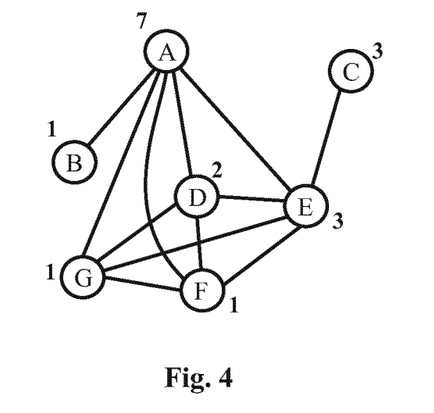
FIG. 4 is an illustration of mapped data as provided by a preferred embodiment of the method according with the invention.

FIG. 4 provides an example of structured graph data as generated using an embodiment of the invention. In this example, a computing device has generated the discovery records provided by Table I during a predetermined timespan including time slots t1 to t12. In this embodiment, no information on the type of access networks is provided. For each discovered access node, an indication of the access node's availability, e.g. the number of discoveries of the access node within the detection timespan with the access node's unique identifier, is computed. Then, the depicted graph data structure is generated, wherein all discovered access nodes are represented by a respective vertex having as weight the computed discovery count, and wherein two vertices are connected by an edge if the corresponding access nodes have been discovered at least once in a same time slot. This complete subjective environment mapping provides a structured view of the computing device's wireless network environment, which is useful for example for later environment/recognition and associated location-based services.

TABLE I discovery records for FIG. 4.

| Access node | t1 | t2 | t3 | t4 | t5 | t6 | t7 | t8 | t9 | t10 | t11 | t12 |
|---|---|---|---|---|---|---|---|---|---|---|---|---|
| A | X | X | X | X | X | X | — | — | — | — | — | — |
| B | — | — | X | — | — | — | — | — | — | — | — | — |
| C | — | — | — | — | — | — | — | X | X | X | — | — |
| D | X | — | — | X | — | — | — | — | — | — | — | — |
| E | X | — | — | — | — | — | — | X | — | — | — | X |
| F | X | — | — | — | — | — | — | — | — | — | — | — |
| G | X | — | — | — | — | — | — | — | — | — | — | — |

Figure 5:
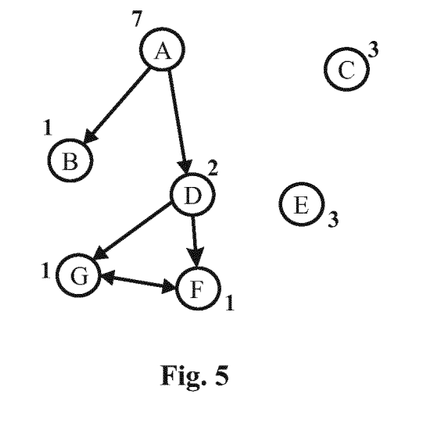
FIG. 5 is an illustration of mapped data as provided by a preferred embodiment of the method according with the invention.

Depending on the application and in accordance with a different embodiment, the graph data generated from the same set of discovery records may be further structured. For example, an acyclic directed graph is generated by connecting a child vertex to a parent vertex only if the access node corresponding to the child vertex has always been discovered in the same time slots as the access node to which the parent vertex corresponds. In this example a parent vertex's children always have a smaller or equal discovery count as the parent itself. Based on the data of Table I, the resulting directed graph is shown in FIG. 5. This mapped data provides information that is even more reliable than that of FIG. 4. The graph vertices in a connected group are likely to be present in the computing device's environment, even if only one of the access nodes is discovered. The additional structure stored in the acyclic directed graph allows for more complex information, where a hierarchical structure among the discovered access nodes is required, for example network routing among discovered access nodes, location/movement tracking of computing devices, and the like. In other embodiments, structuring the graph into a set of rooted trees is also an option. A child vertex is connected to a parent vertex if the set of discovery time slots associated with the parent vertex is the smallest such set among all vertices, which includes the set of discovery timeslots of said child vertex.

As an additional feature to described embodiments of the invention, the information stored in discovery records is enriched using further data obtained from the discovered access node. If the access node is a WiFi™ access nodes, this includes for example information transmitted in beacon frames, such as a MAC address, beacon interval, RSSI, BSS load, country, etc., . . . , in accordance with the access nodes' features. These pieces of information allow to further characterize the discovered access node. If the access node is a cellular data (GSM/CDMA/LTE/ . . . ) node, the further data may include the current cell ID, RSSI, location of the antenna, technology, neighbouring cells, etc. If the discovered access node is Bluetooth™ access node, the further data may include MAC address, RSSI, manufacturer specific data (name, model, etc.) These data allow to further characterize discovered access nodes. For example, based on the signal strength, RSSI, an estimation of an access point's distance to the computing device may be computed, in order to refine the mapped data's structure.

As an additional feature do described embodiments of the invention, the duration of a timespan during which discovery records are recorded at a measuring device, and the frequency of recording discoveries, of network access nodes within a timespan, i.e. the duration of timeslots, are dependent on the context in which the device evolves. The context may for example be evaluated using any sensing means which are operatively connected to the data processing unit of the device, including but not limited to: an accelerometer, a gyroscope, an altimeter, or others. For example, the device may recognize based on sensor data that it is in motion. As the device is in motion, the network environment it is able to detect is more likely to change compared to the situation in which it is at rest. Therefore, the device may increase the frequency of discoveries and/or reduce the timespan for recording discoveries when the device is moving (for example to the order of 30 to 10 seconds), and it may reduce the frequency and/or increase the timespan for recording discoveries when the device is at rest. In another alternative, the evolution of the context may be pre-recorded in a memory element to which the data processing unit has access. Depending on the current time and schedule information describing a pre-recorded context (i.e. "running", "working", . . . ) the data processing unit may be configured to infer that the device is at rest (working) or on the move (running) The frequency of discovery and/or timespan duration for recording discoveries of network access nodes will then be adapted in accordance with the context. In yet another alternative, the processing unit may infer a change of context from the network access nodes that have been discovered: a host of newly discovered access nodes, or an ongoing change in the set of discovered access nodes within a given timespan gives an indication of movement of the device.

In all embodiments, the unique identifiers stored in discovery records may preferably be hashed values of the identifiers that are transmitted by the discovered network access nodes. Known hashing functions, such as md5 or sha-1, provide a unique output from any input data and are irreversible in the sense that the input data cannot be recovered to the output data. Intercepting any such discovery records as such provides no useful information and therefore safeguards the privacy of the device's user. However, when a device compares the hashed identifier of a detected access node to the access node's ID's in said mapped data structure, it may still unambiguously conclude that the discoveries, the first resulting in the mapped data structure and the second being the one that is compared with the data structure, relate to the same access point.

The methods outlined here above are preferably implemented using processing means such as a data processor, which is appropriately programmed, or by specific electronic circuitry, as it is known in the art. The skilled person is capable of providing such programming code means or circuitry providing the required functionality based on the description that has been given, based on the drawings and without undue further burden.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A computer-implemented method for estimating the availability and relative proximity of wireless network access nodes, using a computing device, without using geolocation data of the wireless network access nodes comprising:

discovering wireless network access nodes during consecutive time slots forming a timespan, wherein the computing device includes at least one wireless network interface for communicating with wireless network access nodes, a processing unit, and a memory element;

generating a discovery record for each discovered wireless network access node in each time slot using the processing unit, wherein the discovery record includes a unique identifier of the access node and timing information identifying a current discovery time slot, wherein the discovery record is stored on the memory element;

processing the discovery record using a data processing means after a duration of the timespan, wherein metadata is generated for each discovered access node that includes an indication of an availability of the discovered wireless network access node, wherein the indication includes a discovery count that pertains to a number of discoveries of the discovered wireless network access node within the duration of the timespan, wherein the metadata is associated with the access node's unique identifier on the memory element; and generating data indicating that any two discovered wireless network access nodes were in proximity of one another if they have been discovered in the same time slot, wherein the data is stored on the memory element, wherein the computing device is a mobile device and the discovery of the wireless network access nodes is made while the position of the mobile device is evolving, and wherein the computing device further includes a sensing means for estimating a displacement speed of the computing device, and wherein the duration of the time slots depend on the displacement speed of the device.

2. The computer-implemented method of claim 1, wherein processing the discovery record further includes: generating a graph data structure using the data processing means, wherein the discovered wireless network access nodes are represented by a respective vertex, wherein two vertices are connected by an edge conditionally on a discovery of the corresponding access nodes in a same time slot, wherein any of the two discovered wireless network access nodes are identified as having been in proximity of one another if the corresponding vertices in the graph structure are connected by the edge.

3. The computer-implemented method of claim 1, wherein the data processing means generates data indicating that any of the two discovered wireless network access nodes were in proximity of one another if the discovered wireless network access nodes have been discovered in a same time slot at least a predetermined number of times.

4. The computer-implemented method of claim 1, wherein the data processing means generates data indicating that any of the two discovered wireless network access nodes belong to a particular physical environment if the discovered wireless network access nodes have always been discovered in the same time slot.

5. The computer-implemented method of claim 1, wherein the computing device includes different types of wireless network interfaces for communicating with different types of wireless network access nodes, wherein a particular type of each discovered wireless network access node is stored in the discovery record and the particular type of each discovered wireless network access node is associated with each wireless network access node in mapped data.

6. The computer-implemented method of claim 5, wherein a type of wireless network access node includes a cellular data network access node, a wide area network (WAN) access node, or a personal area network (PAN) access node.

7. The computer-implemented method of claim 1, wherein the data processing means are included as part of the processing unit of the computing device.

8. The computer-implemented method of claim 1, wherein the data processing means are included as part of a processing unit of a network node and receives discovery records from the computing device through a data transmission.

9. The computer-implemented method of claim 1, wherein the unique identifier stored in the discovery record includes an irreversible hashed value of information identifying the discovered wireless network access node.

10. The computer-implemented method of claim 9, wherein the indication of the availability of the discovered wireless network access node includes an indication of at least one of: a received signal strength at the computing device and an indication of a type of wireless network access node.

11. The computer-implemented method of claim 1 further including: associating at least a subset of the wireless network access nodes identified as having been in proximity of one another with a geographical location.

12. The computer-implemented method of claim 1 further including: discovering, at the computing device, at least one access node, generating unique identifiers for the wireless network access nodes and associating an indication of the availability of each wireless network access node with the unique identifiers; concluding that the computing device is located within the wireless networking environment described in the memory element if at least one corresponding subset of the unique identifiers and associated indications is found on the memory element.

13. A system that includes a networking interface, a processing unit and a memory element, wherein the memory element stores instructions when executed by the processing unit cause the processing unit to: generate metadata from a set of provided discovery records spanning a timespan divided into time slots, wherein a discovery record includes a unique identifier of an access node and an index of a discovery time slot;
associate an indication of an availability of the access node, wherein the indication includes a discovery count that includes a number of discoveries of the access node within the timespan, and the resulting metadata is associated with the unique identifier of the access node on the memory element;
generate data indicating that any two discovered access nodes were in proximity of one another if they have been discovered in the same time slot and store data on the memory element, wherein the system is a mobile device and the discovery of the wireless network access nodes is made while the position of the mobile device is evolving, and wherein the system further includes a sensing means for estimating a displacement speed of the system, and wherein the duration of the time slots depend on the displacement speed of the system.

14. A non-transitory computer readable storage medium storing instructions that when executed by a computing device, which includes a processor perform a method, the method comprising:
discovering wireless network access nodes during consecutive time slots forming a timespan, wherein the computing device includes at least one wireless network interface for communicating with wireless network access nodes, a processing unit, and a memory element;
generating a discovery record for each discovered wireless network access node in each time slot using the processing unit, wherein the discovery record includes a unique identifier of the access node and timing information identifying a current discovery time slot, wherein the discovery record is stored on the memory element;
processing the discovery record using a data processing means after a duration of the timespan, wherein metadata is generated for each discovered access node that includes an indication of an availability of the discovered wireless network access node, wherein the indication includes a discovery count that pertains to a number of discoveries of the discovered wireless network access node within the duration of the timespan, wherein the metadata is associated with the access node's unique identifier on the memory element; and
generating data indicating that any two discovered wireless network access nodes were in proximity of one another if they have been discovered in the same time slot, wherein the data is stored on the memory element, wherein the computing device is a mobile device and the discovery of the wireless network access nodes is made while the position of the mobile device is evolving, wherein the computing device further includes a sensing means for estimating a displacement speed of the computing device, and wherein the duration of the time slots depend on the displacement speed of the device.

* * * * *